W. BALL.
Ore Washer.
No. 14,182. Patented Feb. 5, 1856.
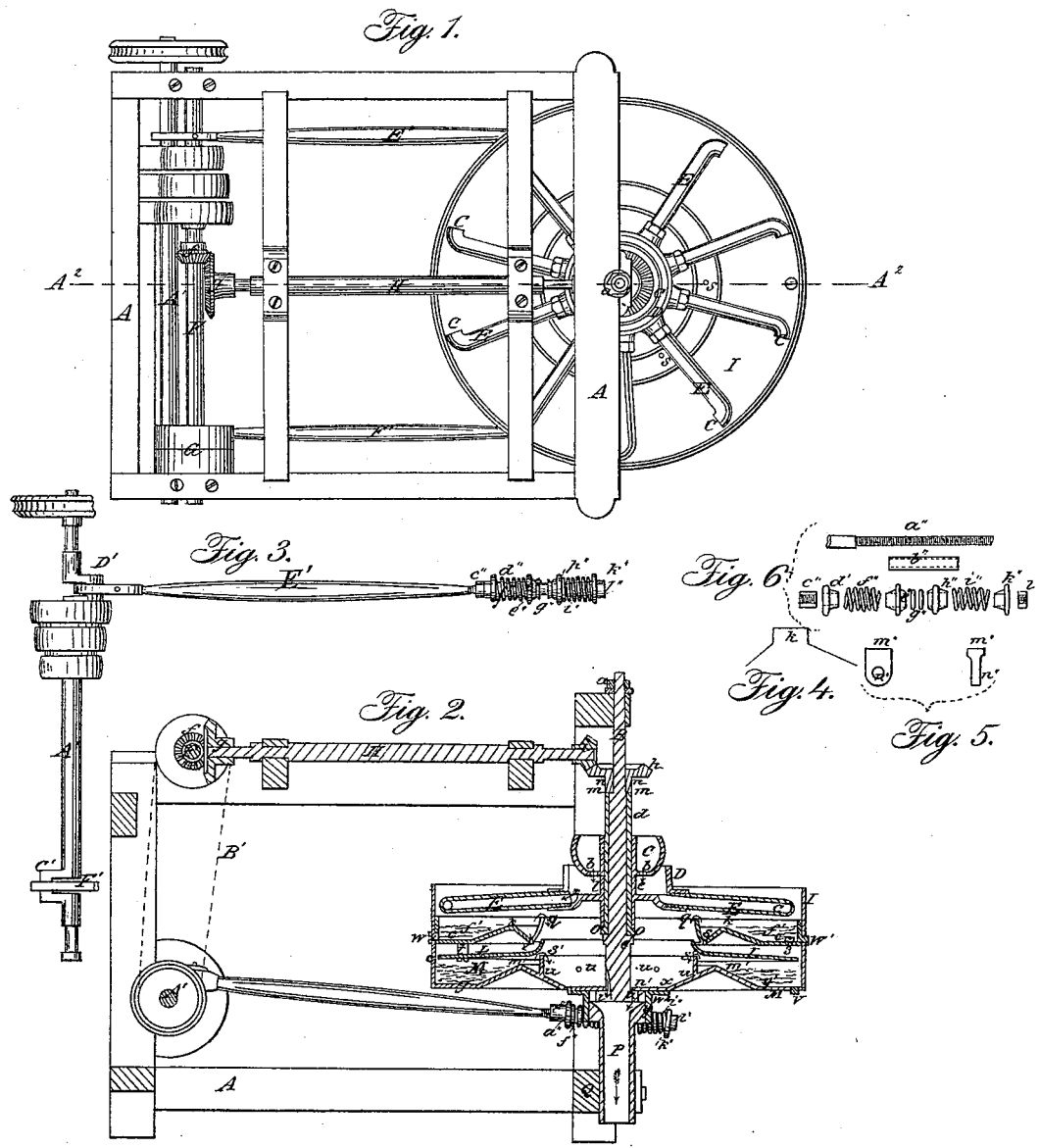

UNITED STATES PATENT OFFICE.

WILLIAM BALL, OF CHICOPEE, MASSACHUSETTS.

ORE-WASHER.

Specification of Letters Patent No. 14,182, dated February 5, 1856.

*To all whom it may concern:*

Be it known that I, WM. BALL, of Chicopee, in the county of Hampden and State of Massachusetts, have invented a new and Improved Machine for Separating Copper and other Metals from their Ores by Washing, which I call a "Concentrator," and that the following is a full, clear, and exact description of the same, reference being had to the annexed drawings, in which—

Figure 1, is a plan of the machine; Fig. 2, a vertical section through the same upon the line $A^2$, $A^2$; Figs. 3, 4, 5, 6, details which will be referred to hereafter.

In the process of washing pulverized ores by hand, the ore is agitated in a pan beneath a body of water, by which means it is kept partially suspended in the water near the bottom of the pan, the heavier or metallic particles sinking and leaving the lighter ones above, still suspended in the liquid. The water is then poured off, but before this can be effected the agitation must be stopped and the ore immediately settles, and thus but a small portion of it is carried off by the water, a fresh supply of water is then added and the operations of shaking and pouring off are repeated until the metallic particles remain behind measurably freed from the lighter or waste portions of the ore.

To perform this operation by machinery in such a manner that the overflowing of the water and the agitation shall be continuous, without the necessity of interrupting the one for the other is the object of my invention.

To accomplish this I have contrived a machine in which the agitation is uninterrupted, and the lighter particles of the ore are permitted continually to flow off with a sufficient quantity of the water, through suitable openings made for the purpose; but in order that these lighter particles of ore may be kept suspended at the level at which they are to flow off a head of water is maintained considerably above this level, by throwing in an excess of water over and above what can escape at the openings through which the ore passes, and permitting this excess to overflow at a still higher point. The ore is thus kept suspended in the water at the level at which it is to flow off, which would not be the case if the ore were permitted to flow over the top of the vessel with the whole of the water.

My invention therefore consists in permitting the water to flow from the trough at two different levels, each of them above that to which the metallic particles are allowed to settle, whereby a head of water is maintained entirely above the ore, which is thus kept loosened and suspended as required.

To enable others skilled in the art to make and use my invention, I will proceed to describe the method which I have adopted of carrying it out.

In the accompanying drawings A, is the frame work of the machine.

B is a vertical shaft suspended from the frame work at $a$. This shaft does not revolve but it sustains and carries all the operative parts of the machine, and vibrates with the troughs I and M.

The apparatus for delivering the material to the machine will now be described.

C, is the receiving basin into which the pulverized material, together with the requisite quantity of water, is run. From this basin it escapes through the holes $b$, into the basin D of the distributer immediately beneath. This latter communicates with the tubular conveyers E, from th open ends $c$, of which the sand and water are delivered. This tubular distributer is caused to rotate uniformly upon the shaft B, in the following manner: G, are the driving pulleys upon the shaft F. This shaft carries a bevel pinion $f$, which engages with bevel wheel $g$, upon the horizontal shaft H. $i$ is a bevel pinion upon this shaft which drives the bevel wheel $h$, upon a short sleeve $n$. This sleeve revolves loosely upon the shaft B, and has two projecting teeth $m$, which enter slots in the top of a second sleeve $d$, which latter rests upon the offset $e$ on the shaft B, and revolves loosely thereon. In the center of the distributer basin D, is the hollow bearing $l$, which embraces the sleeve $d$, and is supported by the long washer or thimble $p$, which rests upon the shoulder $o$, of the sleeve. The receiving basin C, in like manner is fitted to the hollow bearing of the distributer, and thus the distributer and the receiving basin are carried by the sleeve $d$, and as the cog wheel $h$, revolves, through the connection of the parts already explained, the distributer is also revolved, the friction of its bearings upon the sleeve $d$, being sufficient to drive it.

The pulverized ore and water as they fall from the orifices of the tubes E, are received by the annular trough I, in which the first washing takes place. The construction and operation of this trough and the parts immediately connected therewith will now be explained. The bottom of this trough is of the form represented in section in Fig. 2. Aa *k*, it rises to within an inch of the top of the trough. At *q*, there is a slight perpendicular rise of ¼ inch at the point *k*, not visible in Fig. 2 on account of the smallness of the scale, but represented full size in Fig. 4. *s* are holes through the bottom of the interior of this trough of a size dependent upon the nature and fineness of the material to be operated upon. Immediately beneath this trough, and secured thereto by the screws *t* is the plate L, and beneath this plate is the secondary or auxiliary trough M, the bottom of which is substantially similar to that of the superior trough I.

*u*, are openings through the inner wall of the lower trough, the object of which will be presently explained.

*w'* are screws which secure the two troughs together, and by means of the screws *x*, which pass through the bottom plate of the lower trough M, the latter is secured firmly to a hub *y* and circular plate $w^2$ attached to the vertical shaft B. This shaft terminates in the spout or hollow conveyer P, which is guided and steadied by the bearing Q.

*z* and *v* are openings through the bottom of the washing troughs, which are closed by screw plugs or otherwise, and are for the purpose of withdrawing the metal from the machine when the operation has proceeded sufficiently far.

A rapid vibratory motion is communicated to the troughs I and M in the following manner. From the shaft F motion is communicated to the shaft A' by the band B'. C' D' are cranks upon the shaft A' (Fig. 3,) which vibrate the pitmen E' F'.

From the rectilinear reciprocating motion thus produced, a vibrating motion of the troughs I and M is produced in the following manner: *a''*, Figs. 2, 3 and 6, is a screw cut upon the end of the pitmen E' F', over which for the purpose of protecting its threads from injury passes the tube or sleeve *b''*. *c''* are jam nuts seen in Fig. 2. Next this comes the washer *d''*. Against this washer bears the spiral spring *f''*, the other end of which rests upon another washer also strung upon the tube *b''*. This washer has a concave bearing *e''* which receives one of the convex washers *g''*. The other rests against a similar concave bearing in the washer *h''*, between which and the washer *k''* is the spring *i''*, the whole being held in place by the nut *l''*.

Projecting from the bottom plate of the trough M are the ears *m''*, Fig. 5, through the holes *n''* in which the tube *b''* and screw *a''* is passed. The other parts are then arranged in the order represented in Fig. 3, the ears *m''* being confined between the concave washers *g''* and thus as the shaft A' revolves the convex washers *g''* are allowed to move on their concave bearings, and the troughs are vibrated without torsion or strain upon the parts, the springs *f'' i''* serving to give ease to the motion of the parts.

Operation: The pulverized ore and water are conducted in any suitable manner and in proper quantities to the basin C, thence they pass through the holes *b* to the distributer basin D, and through the tubes E they are evenly and uniformly distributed around the periphery of the first or upper trough. The water is admitted in quantity much greater than can pass through the holes *s*, and continually flows over the inner edge *q* of the trough. It is at this point that the distinguishing feature of my invention manifests itself. This portion of the operation will therefore be minutely described. The pulverized ore rises sufficiently high to pass over the ledge *k*, when it is immediately washed through the holes *s* by the stream of water constantly passing through them. As the trough vibrates the bottom plate partly slips beneath the particles of sand, and partly communicates its motion to them, at the same time the water which remains comparatively motionless above the sand, retards its uppermost particles and rolls them over, and the latter are thus constantly loosened up and kept in motion with respect to each other. The metallic particles are thus allowed to descend to the bottom of the trough, where they accumulate as seen at *c'* Fig. 2. Above this the lighter particles collect, as at *f'*, and pass continually over the ledge *k* and through the holes *s*, as before described. So soon as this accumulation commences the particles pack together in the bottom of the trough and then move with it in its vibrations, the lighter particles, still being agitated and kept suspended in the water above the surface of the compacted metallic particles.

It is evident that the trough should be vibrated with just that force which shall permit the metallic grains to settle and compact as above explained, and at the same time shall keep the lighter particles of the ore suspended in the water. If this force be materially increased, then the metallic particles will not settle and compact but will be themselves agitated and consequently will flow over with the waste ore, and a loss will be the result. If the force with which the trough be vibrated be materially less than that necessary to produce the most desirable result then although the metallic particles may all be saved, yet they will be mixed with a greater proportion of waste ore and the effective operation of the machine will be clogged.

Should any metallic particles pass off with the waste sand, the latter is again subjected to a second washing in the following manner: Having passed through the holes $s$, it is received by the plate L and immediately carried by the water which passes over at $q$ to the point $i'$ and into the lower trough M. This trough being vibrated with the one above it the pulverized ore is submitted to a similar operation to that to which it was subjected in the upper trough, being rubbed and partially set in motion by the bottom plate of the trough, while this motion is at the same time retarded by the water which remains stationary, or very nearly so, and the particles are rolled over and kept in constant motion with respect to each other as before at the level of the ledge $m'$, over which they are permitted to pass. Any metallic particles which may have escaped from the first trough settle immediately at the bottom of the second and collect at $y'$. The waste ore passes off as before over the ledge $m'$ through the holes $u$ and is washed by the water which passes through these same holes, and over the inner edge $s'$ of this trough down through the holes $l'$ $u'$ into and off through the hollow shaft P. This operation is continued until the copper or other metal has collected in the upper basin to near the ledge $k$, or to as great a height as it is found expedient to permit it to accumulate. The flow of material into the basin C, as well as the motion of the machine itself is then stopped, the holes $z$ and $v$ are opened, and the machine is tilted slightly forward to facilitate the discharge of the metal, a stream of clear water being turned into the basin C, to assist in loosening up the deposit and washing it out and the machine being set in motion for the purpose of facilitating the operation.

What I claim as my invention and desire to secure by Letters Patent in machines for washing pulverized ores is—

The trough I when constructed with the ledge $k$ as described and operated in connection with a head of water kept above the level of the said ledge in the manner herein set forth.

WM. BALL.

Witnesses:
SAM. COOPER,
THOMAS GLOVER.